(12) United States Patent
Yao et al.

(10) Patent No.: US 7,504,080 B2
(45) Date of Patent: Mar. 17, 2009

(54) PROCESS FOR THE REMOVAL OF HEAVY METALS FROM GASES, AND COMPOSITIONS THEREFOR AND THEREWITH

(75) Inventors: Jianhua Yao, Bartlesville, OK (US); Marvin M. Johnson, Bartlesville, OK (US); Edward L. Sughrue, II, Bartlesville, OK (US); Glenn W. Dodwell, Bartlesville, OK (US); Joseph B. Cross, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 750 days.

(21) Appl. No.: 11/104,205

(22) Filed: Apr. 12, 2005

(65) Prior Publication Data

US 2006/0229200 A1    Oct. 12, 2006

(51) Int. Cl.
- *B01D 53/64* (2006.01)
- *B01J 20/00* (2006.01)
- *B01J 20/06* (2006.01)
- *B01J 20/20* (2006.01)
- *B01J 20/30* (2006.01)
- *B01J 23/22* (2006.01)

(52) U.S. Cl. ............. 423/210; 252/182.11; 252/182.32; 502/353; 502/400; 502/416; 502/439; 502/514; 502/516

(58) Field of Classification Search ................. 423/210; 252/182.11, 182.32; 502/353, 400, 416, 502/439, 514, 516, 417
See application file for complete search history.

(56) References Cited

U.S. PATENT DOCUMENTS

| | | | |
|---|---|---|---|
| 3,194,629 A | 7/1965 | Dreibelbis et al. ................ 23/2 |
| 3,667,910 A | 6/1972 | Eguchi ......................... 23/178 |
| 3,887,683 A | 6/1975 | Abe et al. .................... 423/235 |
| 4,212,852 A * | 7/1980 | Aibe et al. .................. 423/230 |
| 4,259,304 A * | 3/1981 | Steiner .................. 423/244.03 |
| 4,500,327 A | 2/1985 | Nishino et al. .................. 55/72 |
| 4,578,256 A * | 3/1986 | Nishino et al. ............... 423/210 |
| 5,354,357 A | 10/1994 | Markovs et al. ................ 75/670 |
| 5,435,980 A | 7/1995 | Felsvang et al. ............. 423/210 |
| 5,527,755 A | 6/1996 | Wenski et al. |
| 5,607,496 A | 3/1997 | Brooks ......................... 75/670 |
| 5,672,323 A | 9/1997 | Bhat et al. ................... 422/172 |
| 5,997,829 A * | 12/1999 | Sekine et al. ................ 423/210 |
| 6,027,697 A | 2/2000 | Kurihara et al. ............. 422/171 |
| 6,136,749 A | 10/2000 | Gadkaree et al. ............ 502/183 |
| 6,248,217 B1 | 6/2001 | Biswas et al. ............. 204/157.4 |
| 6,794,539 B2 | 9/2004 | Unverricht |
| 7,004,990 B2 * | 2/2006 | Brey et al. ..................... 55/524 |
| 2002/0035925 A1 | 3/2002 | El-Shoubary et al. |
| 2003/0170159 A1 | 9/2003 | Honjo et al. |
| 2005/0129597 A1 * | 6/2005 | Cross et al. .............. 423/213.2 |

OTHER PUBLICATIONS

Research Disclosure-Dec. 1998/1569 No. 41604, disclosed by Shell International B.V.
Article entitled "Special Report: Emissions Control; Emissions—Control technologies continue to clear the air", Power Magazine, May/Jun. 2002, by Robert Swanekamp http://www.platts.com/engineering/issues/Power/0205/0205pwr_sr-emissions.shtml.
A.F.Wells, *Structural Inorganic Chemistry*, pp. 565-569, 1984.
Soren Enevoldsen, Flemming G. Hansen, Torben Slabiak, Bjarne Dyrved, "SCR Catalyst Improvement" found on the internet at www.netl.doe.gov/publications/proceedings/99/99scr-sncr/enevolds.pdf; 1999.
DOE by Paul Yosick, A Project Fact Sheet entitled "SNOX Flue Gas cleaning Demonstration Project", found on the internet at http://www.lanl.gov/projects/cctc/factsheets/snox/snoxtmdemo.html; 2001.

* cited by examiner

*Primary Examiner*—Timothy C Vanoy
(74) *Attorney, Agent, or Firm*—Jeffrey R. Anderson

(57) ABSTRACT

A composition containing vanadium, and an amorphous carbon selected from the group consisting of an activated carbon, an activated charcoal, and combinations thereof, which is heated to a calcination temperature at or less than about 210° C. A method of preparing such composition is also disclosed. The composition is employed in a process to remove a heavy metal from a gaseous feed stream which can optionally include a separate heavy metal adsorption stage.

77 Claims, 6 Drawing Sheets

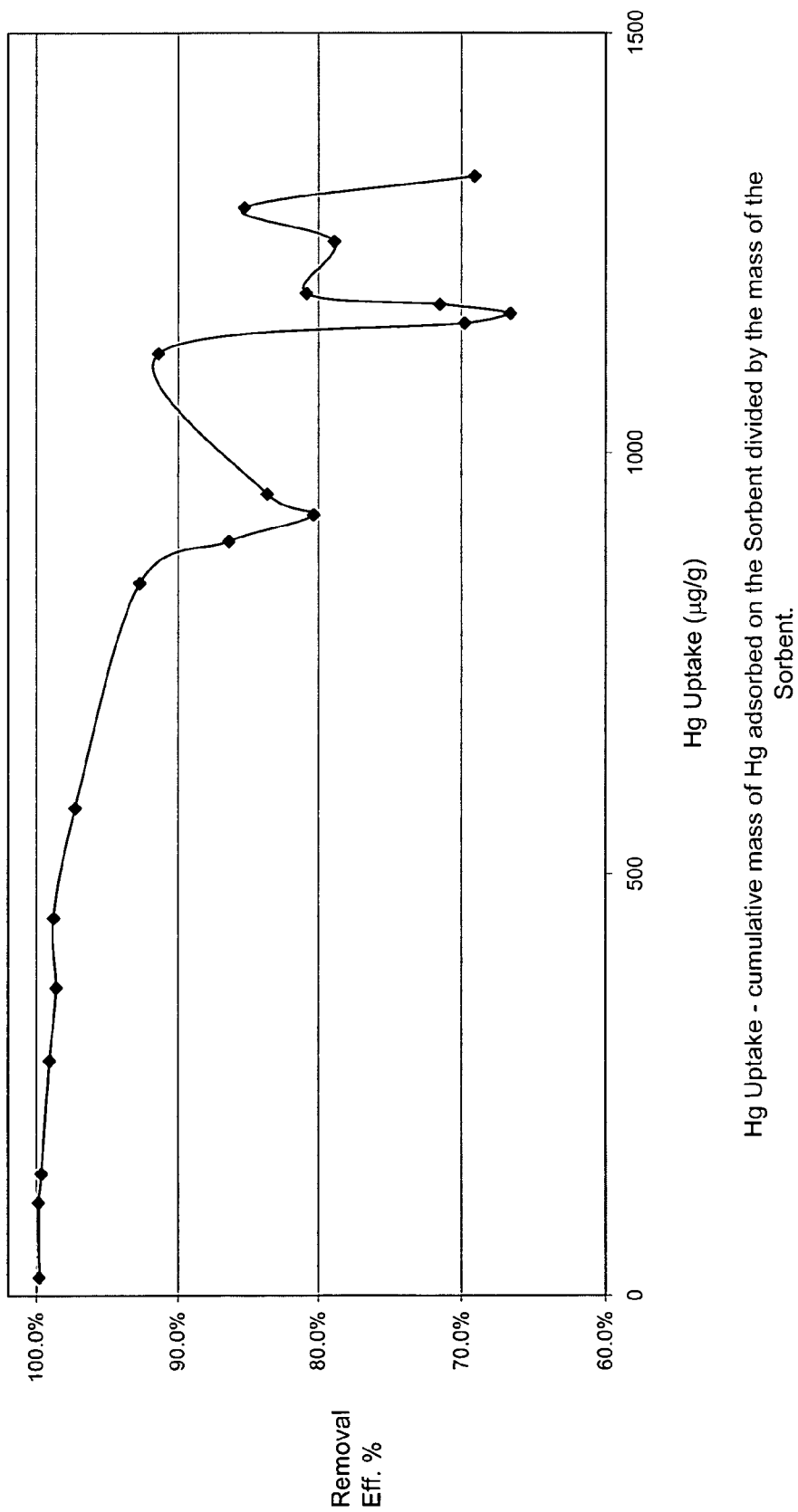

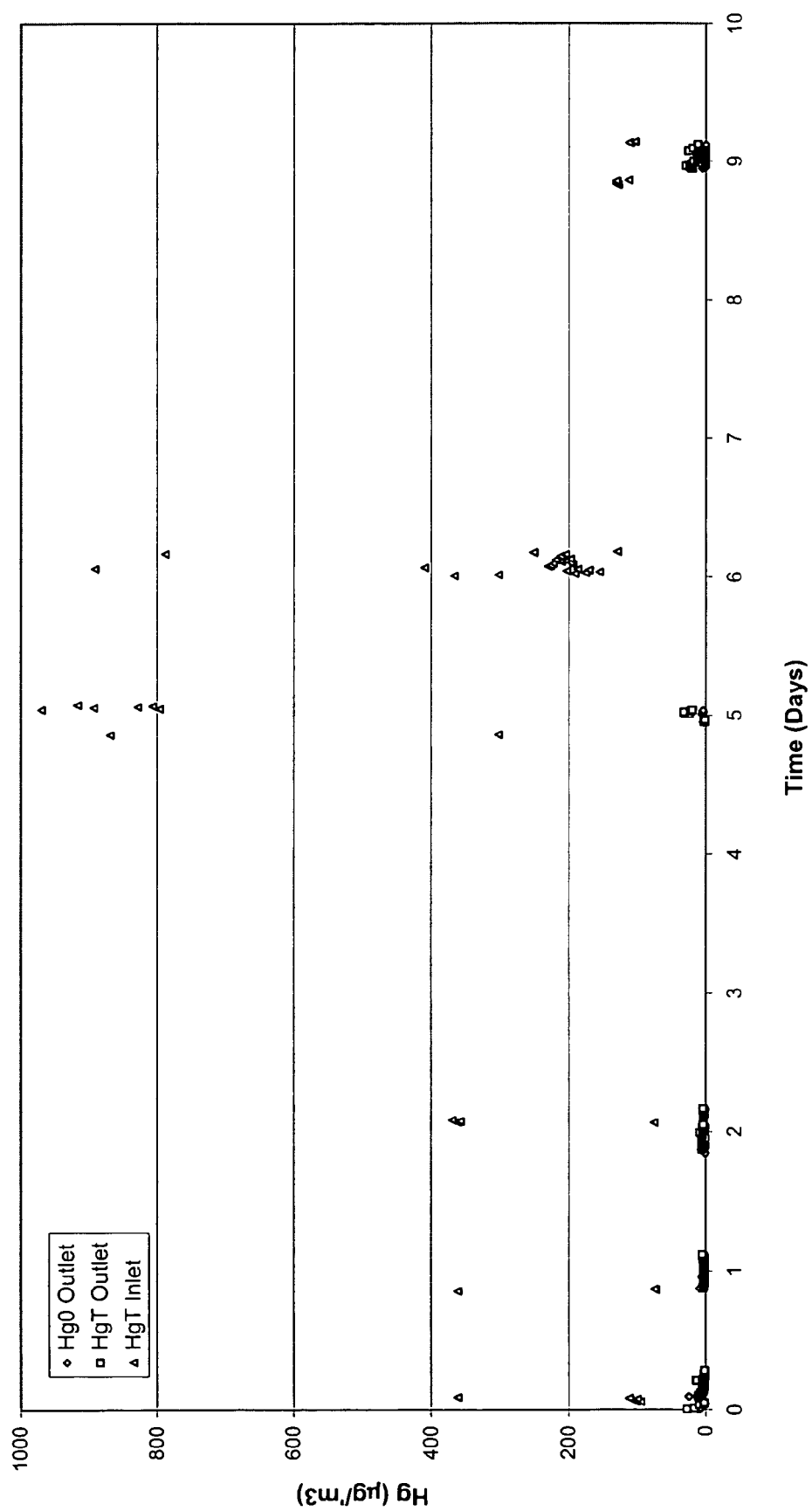

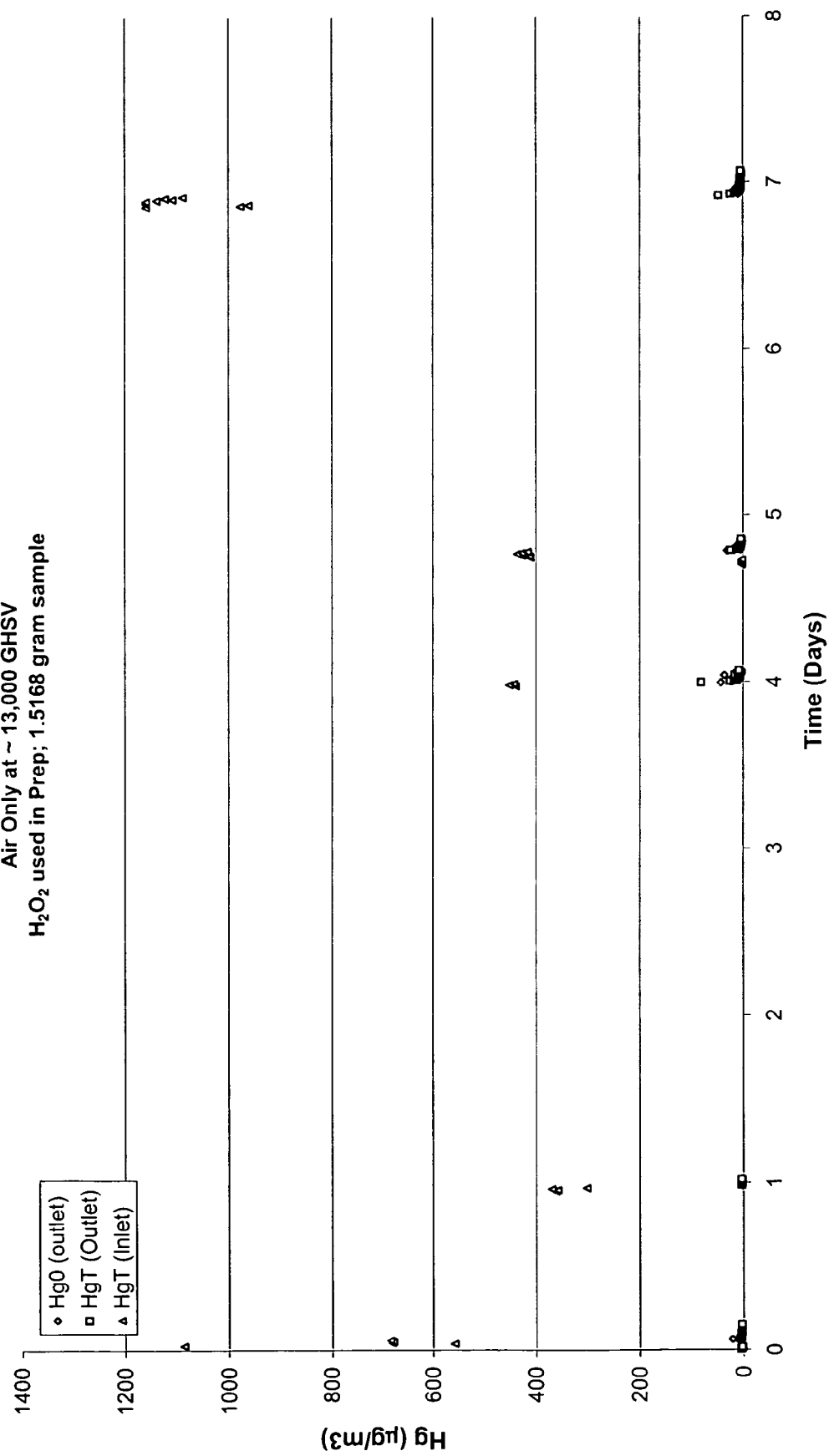

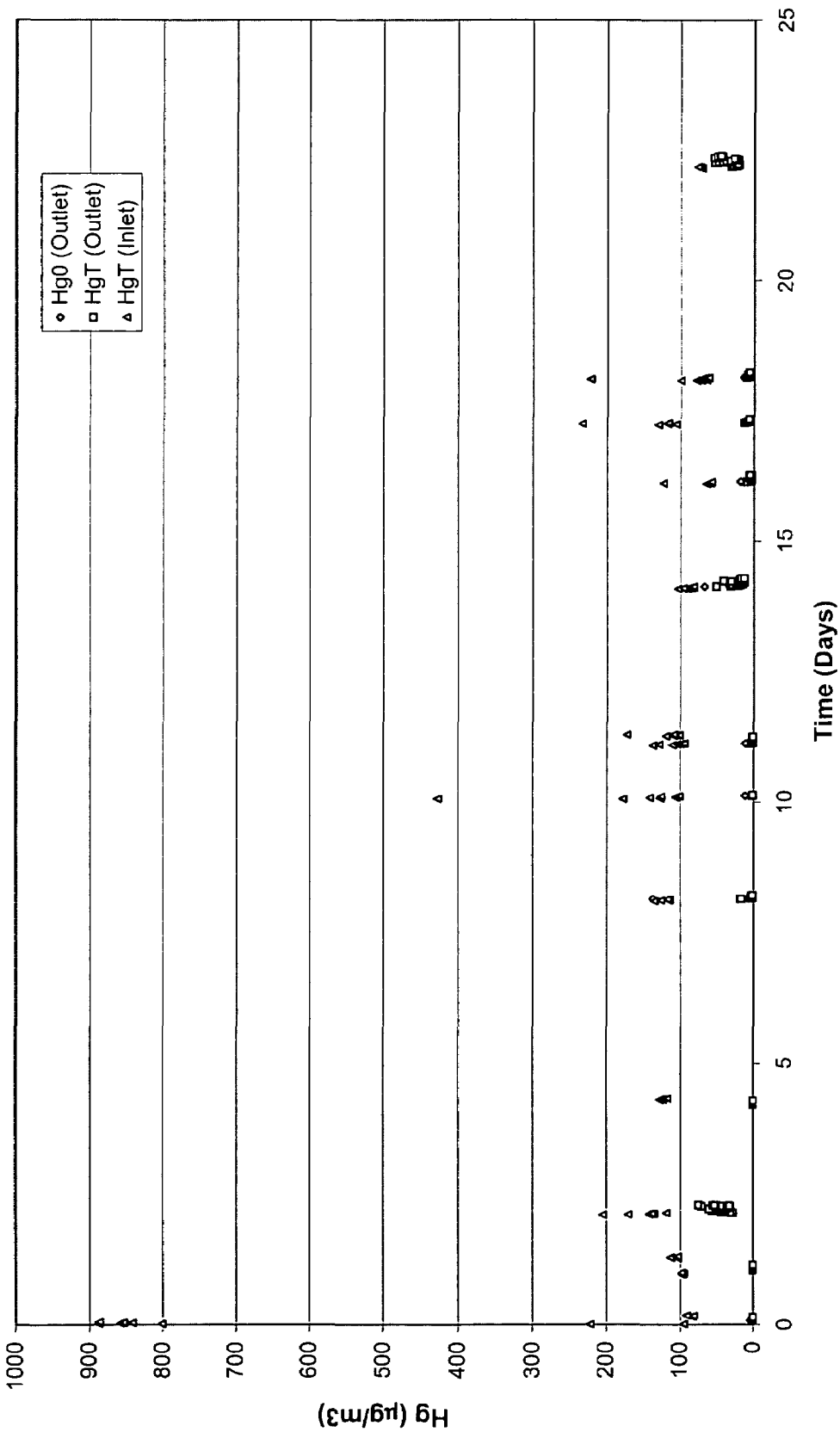

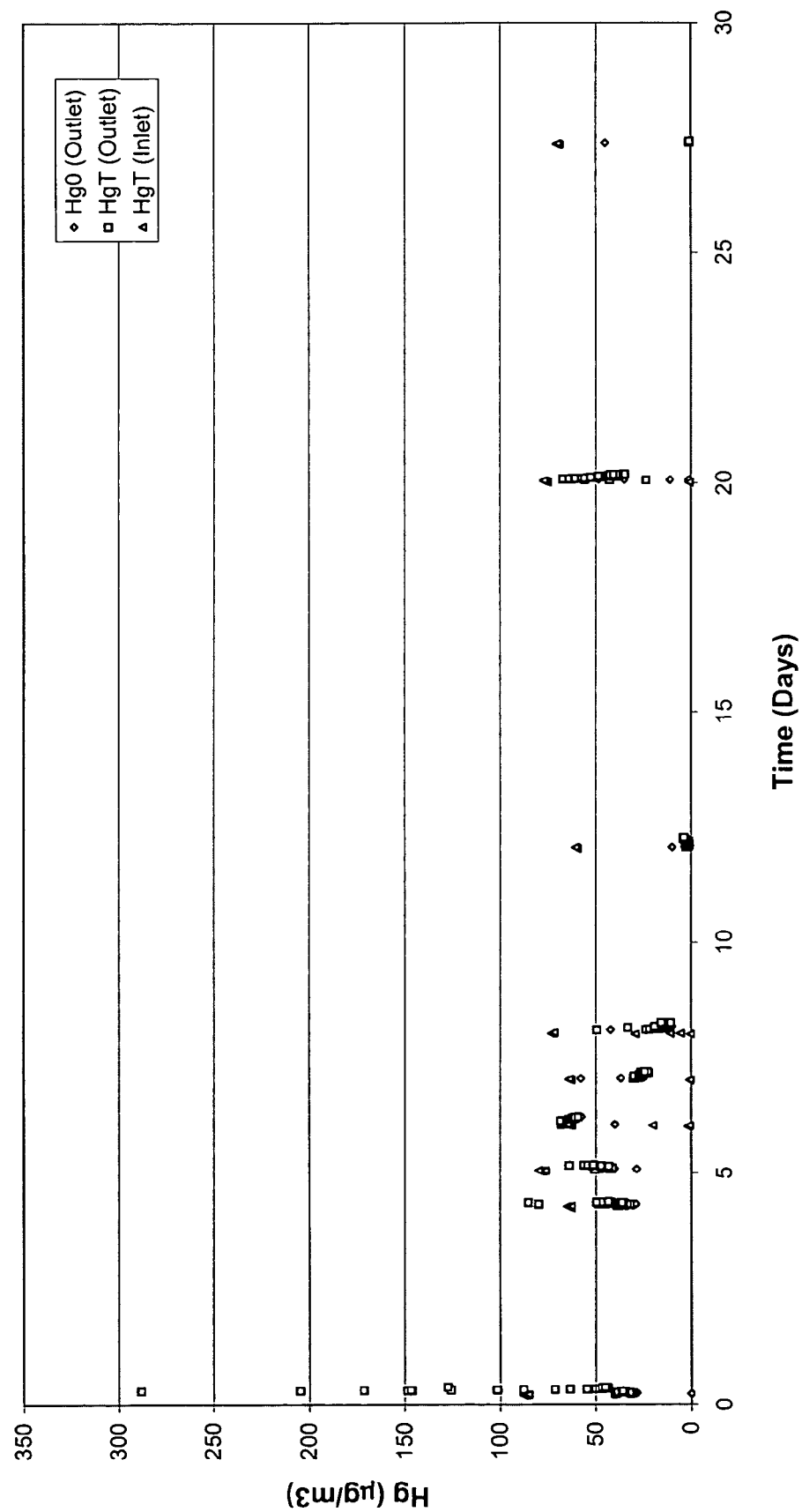

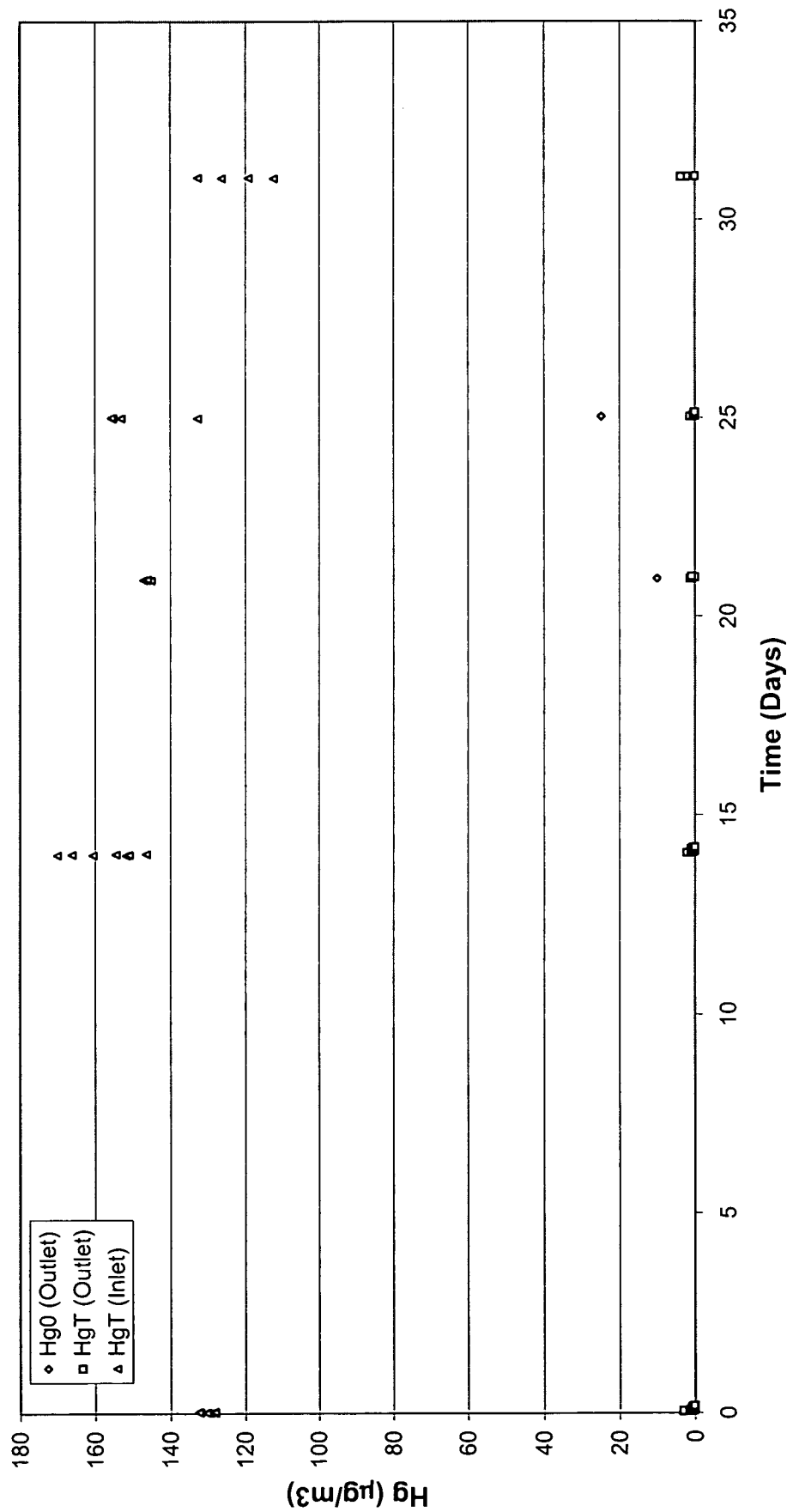

US 7,504,080 B2

PROCESS FOR THE REMOVAL OF HEAVY METALS FROM GASES, AND COMPOSITIONS THEREFOR AND THEREWITH

The invention relates to a composition useful in the removal of heavy metals from a gaseous feed stream. In one aspect the invention relates to a method of preparing such composition. In yet another aspect the invention relates to a method of removing heavy metals from a gaseous feed stream using the inventive composition.

BACKGROUND OF THE INVENTION

Heavy metals are released during the combustion process of many fossil fuels and/or waste materials. These heavy metals include, for example, arsenic, beryllium, lead, cadmium, chromium, nickel, zinc, mercury and barium. Most of these heavy metals are toxic to humans and animals. In particular, lead is thought to compromise the health and mental acuity of young children and fetuses.

Furthermore, there is every indication that the amount of mercury, and possibly of other heavy metals, now legally allowed to be released by those combusting various fossil fuels and/or waste materials, including coal burning powerplants, and petroleum refineries, will be reduced by future legislation. While a variety of adsorbents are available for capture of heavy metals (in particular mercury), these adsorbents tend to have low capacities and are easily deactivated by other components in the gas stream, such as sulfur and nitrogen oxides. We have discovered a material that converts an elemental heavy metal to an oxidation state greater than zero, even in the presence of sulfur oxides and nitrogen oxides.

SUMMARY OF THE INVENTION

It is an object of this invention to provide an improved vanadium material which when used in the removal of heavy metal results in oxidation of the heavy metal to an oxidation state greater than zero, even in the presence of sulfur oxides and nitrogen oxides.

A further object of this invention is to provide a method for making an improved vanadium material which when used in the removal of heavy metal results in oxidation of the heavy metal to an oxidation state greater than zero, even in the presence of sulfur oxides and nitrogen oxides.

Another object of this invention is to provide an improved process for the removal of heavy metal from a heavy metal containing gas which results in oxidation of the heavy metal to an oxidation state greater than zero, even in the presence of sulfur oxides and nitrogen oxides, with an optional second stage for adsorption of oxidized heavy metal.

In accordance with a first embodiment of the invention, the inventive composition comprises vanadium, and an amorphous carbon selected from the group consisting of an activated carbon, an activated charcoal, and combinations thereof, which is heated to a calcination temperature at or less than about 210° C.

In accordance with a second embodiment of the invention, the inventive composition can be prepared by the method of:

a) incorporating a vanadium compound onto, into, or onto and into an amorphous carbon selected from the group consisting of an activated carbon, an activated charcoal, and combinations thereof, in the presence of an oxidizing agent and a solvent, to thereby form a vanadium incorporated amorphous carbon; and b) calcining the vanadium incorporated amorphous carbon in the presence of oxygen and the solvent at a calcination temperature; wherein the calcination temperature is sufficient to volatilize and remove substantially all of the solvent; and wherein the calcination temperature is at or less than about 210° C., to thereby form the composition.

In accordance with a third embodiment of the invention, the inventive composition can be used in the removal of heavy metal from a gaseous feed stream comprising heavy metal by contacting, in a contacting zone, the gaseous feed stream with any of the inventive compositions of embodiments one or two above, with an optional second stage for adsorption of oxidized heavy metal.

Other objects and advantages of the invention will become apparent from the detailed description and the appended claims.

BRIEF DESCRIPTION OF THE DRAWINGS

FIG. 1 is a graphic illustration of the removal efficiency percent vs. Hg uptake for Sorbent B when used for mercury removal from a gas stream.

FIG. 2 is a graphic illustrations of the mercury removal efficiency for Sorbent C when used for mercury removal from a gas stream.

FIG. 3 is a graphic illustration of the mercury removal efficiency for Sorbent C when used for mercury removal from a gas stream.

FIG. 4 is a graphic illustrations of the mercury removal efficiency for Sorbent D when used for mercury removal from a gas stream.

FIG. 5 is a graphic illustration of the mercury removal efficiency for Sorbent D when used for mercury removal from a gas stream.

FIG. 6 is a graphic illustration of the mercury removal efficiency for Sorbent D when used for mercury removal from a gas stream.

DETAILED DESCRIPTION OF THE INVENTION

In accordance with the first embodiment, the composition comprises, consists of, or consists essentially of vanadium, and an amorphous carbon selected from the group consisting of an activated carbon, an activated charcoal, and combinations thereof, which is heated to a calcination temperature at or less than about 210° C., preferably at or less than about 205° C., and most preferably at or less than about 200° C. The composition is also preferably prepared in the presence of an oxidizing agent such as hydrogen peroxide.

In accordance with the second embodiment of the present invention, the composition can be prepared by the method of:

a) incorporating a vanadium compound onto, into, or onto and into an amorphous carbon selected from the group consisting of an activated carbon, an activated charcoal, and combinations thereof, in the presence of an oxidizing agent and a solvent, to thereby form a vanadium incorporated amorphous carbon; and b) calcining the vanadium incorporated amorphous carbon in the presence of oxygen and the solvent at a calcination temperature; wherein the calcination temperature is sufficient to volatilize and remove substantially all of the solvent; and wherein the calcination temperature is at or less than about 210° C., preferably at or less than about 205° C., most preferably at or less than about 200° C.

The vanadium compound can be any vanadium containing compound capable of incorporation into, onto or onto and into a support. Preferably, the vanadium compound is selected from the group consisting of 1) ammonium metavanadate, 2) an alkali metavanadate of the formula MVO$_3$, wherein M can be an alkali metal selected from Group IA, and 3) combinations of any two or more thereof. The most preferable vanadium compound is ammonium metavanadate.

The oxidizing agent can be any agent capable of oxidizing vanadium, and preferably is hydrogen peroxide or oxygen. The solvent is preferably an aqueous solution of oxalic acid. Also, the calcination time period is in the range of from about 0.1 hour to about 24 hours, and more preferably in the range of from about 1 hour to about 4 hours.

The vanadium compound can be incorporated into, onto, or onto and into the amorphous carbon by any suitable method known to those skilled in the art. Preferably, the vanadium compound is incorporated into, onto, or into and onto the amorphous carbon by incipient wetness impregnation.

During the calcining step, preferably at least 90 wt. % of the solvent present in the incorporating step is removed.

The following discussion applies to each of the compositions of the first and second embodiments of the present invention.

The amorphous carbon has a surface area in the range of from about 20 m$^2$/gm to about 800 m$^2$/gm, preferably from about 100 m$^2$/gm to about 500 m$^2$/gm.

Additionally, the vanadium is present in the composition, on an elemental vanadium basis, in an amount in the range of about 0.2 to about 28 wt. %, preferably from about 0.4 to about 11 wt. %, and most preferably from about 0.8 to about 8.5 wt. %, based on the total weight of the composition.

In accordance with the third embodiment of the present invention, the inventive composition can be used in the removal of heavy metal from a gaseous feed stream comprising a heavy metal and oxygen by a process comprising, consisting of, or consisting essentially of contacting, in a contacting zone, under heavy metal removal conditions, the gaseous feed stream with any of the inventive compositions, and combinations thereof, of embodiments one and two above. A gaseous product stream is withdrawn from the contacting zone. The gaseous feed stream is typically a combustion gas; and is more typically a stack gas derived from the combustion of coal. The gaseous feed stream can also further comprise contaminants selected from the group consisting of sulfur oxides, CO$_2$, water, nitrogen oxides, HCl, and combinations of any two or more thereof.

The contacting of the gaseous feed stream with the inventive composition is preferably carried out at a temperature in the range of from about 100 to about 180° C., more preferably from about 125 to about 180° C., and most preferably from about 130 to about 170° C.

The heavy metal typically comprises a metal selected from the group consisting of arsenic, beryllium, lead, cadmium, chromium, nickel, zinc, mercury, barium, and combinations of any two or more thereof. The heavy metal most typically comprises mercury.

When the heavy metal is mercury, the mercury is typically present in the gaseous feed stream in an amount in the range of from about 0.1 to about 10,000 µg/m$^3$, more typically in the range of from about 1 to about 800 µg/m$^3$ and most typically from about 3 to about 700 µg/m$^3$.

The composition preferably converts at least a portion of the heavy metal in the gaseous feed stream to an elevated oxidation state. In the case of mercury, the composition preferably converts at least a portion of the mercury contained in the gaseous feed stream from a zero oxidation state to a +1 or a +2 oxidation state and also preferably removes mercury. "At least a portion", as used in this paragraph, can mean at least 20 weight %, preferably at least 30 weight %, and more preferably at least 50 weight % mercury based on the total amount of mercury contained in the gaseous feed stream.

The gaseous product stream preferably contains less than about 20 weight % more preferably less than about 10 weight %, and most preferably less than about 5 weight % of the heavy metal contained in the gaseous feed stream.

The gaseous product stream is optionally contacted with a separate adsorbent in an adsorption zone. The adsorbent can be any adsorbent capable of adsorbing a heavy metal. More preferably, the adsorbent comprises, consists of or consists essentially of a material selected from the group consisting of a zeolite, amorphous carbon, and combinations thereof. The amorphous carbon can be an activated carbon or an activated charcoal. A treated gaseous product stream is withdrawn from the adsorption zone and contains less than about 20 weight %, preferably less than about 10 weight %, and more preferably less than about 5 weight % of the heavy metal contained in the gaseous feed stream.

EXAMPLES

The following examples are intended to be illustrative of the present invention and to teach one of ordinary skill in the art to make and use the invention. These examples are not intended to limit the invention in any way.

Preparation of Sorbent A

A 3.85 gram quantity of ammonium metavanadate (NH$_4$VO$_3$) was dissolved in 20 ml of a saturated solution of oxalic acid using a stirred hotplate. To this solution, 50% hydrogen peroxide was added dropwise to maintain a reddish color. The vanadium containing solution was then added to 20 grams of NuChar activated charcoal obtained from Mead West Vaco. After the activated charcoal was impregnated with the solution, the solid was dried in air at 200° C. for about 2 hours. The sample lost considerable weight, thought to be due to oxidation of the charcoal. This sample was not tested for mercury removal.

Preparation of Sorbent B

A 1.28 gram quantity of ammonium metavanadate (NH$_4$VO$_3$) was dissolved in 15 ml of a saturated solution of oxalic acid using a stirred hotplate. Hydrogen peroxide was not added to the solution. The vanadium containing solution was then added to 20 grams of NuChar activated charcoal obtained from Mead West Vaco. After the activated charcoal was impregnated with the solution, the solid was dried in air at 120° C. for about 3 hours. Then, the material was calcined in air for 2 hours at around 200° C.

Preparation of Sorbent C

A 2.56 gram quantity of ammonium metavanadate (NH$_4$VO$_3$) was dissolved in 20 ml of a saturated solution of oxalic acid using a stirred hotplate. To this solution, 2 drops of 50% hydrogen peroxide was added to maintain a reddish color. The vanadium containing solution was then added to 20 grams of NuChar activated charcoal obtained from Mead West Vaco. The above steps were repeated 5 times in order to make ~100 g of sorbent. After the activated charcoal was impregnated with the solution and all 5 portions were combined, the solid was dried at about 116° C. for about 2 hours. The material was calcined under N$_2$ for 2 hours at around 310° C., then cooled to 150° C. whereupon the N$_2$ blanket was replaced by air, and the 150° C. temperature under air flow was held for 1 hour.

Preparation of Sorbent D

A 1.54 gram quantity of ammonium metavanadate (NH$_4$VO$_3$) was dissolved in a solution containing 5 ml of a 2

Molar oxalic acid solution and 20 ml of water, using a stirred hotplate. Hydrogen peroxide was not added to the solution. The vanadium containing solution was then added to 20 grams of NuChar activated charcoal obtained from Mead WestVaco. After the activated charcoal was impregnated with the solution, the solid was dried at 110° C. for about 1.5 hours. Then, the material was calcined under $N_2$ for 2 hours at around 149° C.

Evaluation of Sorbent to Remove Mercury

The following procedure was used to test the ability of the sorbent to remove mercury from a gas stream. Mercury was added by passing the gas stream at room temperature through a gas bottle containing elemental mercury. The mercury content in the gas stream could be varied, and was measured for each Run. The mercury containing gas stream was then passed through a sample tube containing the sorbent. The tube was located in a furnace wherein the temperature was held constant at around 150° C. The efficiency of mercury removal was determined by measuring the amount of mercury entering and leaving the solid sorbent and is defined as the difference between the inlet and outlet mercury concentrations divided by the inlet concentration. These concentrations were determined by using a Jerome Mercury Analyzer for Sorbent B that measures only elemental mercury; and a PS analytical mercury analyzer for Sorbents C through E which measures ionic and elemental mercury. Results are shown in the Figures.

For some tests, water, HCl and sulfur and nitrogen oxides were added to the gas stream prior to contact with the sorbent such that the gas stream contained around 700 ppm µg/m³ $SO_2$, around 140 ppm NO and around 7 ppm $NO_2$. To add moisture, the gas stream was passed through a water bubbler (e.g., at a temperature of 50° C., the gas stream will contain 10% water vapor).

The results in the Figures clearly indicate that the inventive sorbents are effective for mercury removal. FIG. 1 shows that the Hg removal efficiency of Sorbent B, which was prepared without the use of $H_2O_2$, dropped off fairly substantially after reaching ~1000 µg/g of Hg uptake. FIGS. 2 and 3 show that Sorbent C, which was prepared using $H_2O_2$, maintained high Hg removal efficiency, whether in the presence of air only or a high $SO_2$, $NO_x$, HCl flue blend, and overall had higher Hg removal efficiencies as compared to Sorbent D in FIG. 5, which was prepared without the use of $H_2O_2$.

FIGS. 4 and 6 show that the Hg removal efficiency for a gas blend containing $SO_2$ and $NO_x$ for Sorbent D, which was prepared without the use of $H_2O_2$, was not as high as that shown in FIG. 2 for Sorbent C for a gas blend containing $SO_2$ and $NO_x$.

Reasonable variations, modifications and adaptations can be made within the scope of the disclosure and appended claims without departing from the scope of the present invention.

That which is claimed is:

1. A composition comprising vanadium oxide, and an amorphous carbon selected from the group consisting of an activated carbon, an activated charcoal, and combinations thereof, which is heated to a calcination temperature at or less than about 210° C.

2. A composition in accordance with claim 1 wherein said amorphous carbon has a surface area in the range of from about 20 m²/gram to about 800 m²/gram.

3. A composition in accordance with claim 1 wherein said vanadium oxide is present in said composition, on an elemental vanadium basis, in an amount in the range of from about 0.2 to about 28 wt. percent, based on the total weight of said composition.

4. A composition in accordance with claim 1 wherein said vanadium oxide is present in said composition, on an elemental vanadium basis, in an amount in the range of from about 0.4 to about 11 wt. percent, based on the total weight of said composition.

5. A composition in accordance with claim 1 wherein said vanadium oxide is present in said composition, on an elemental vanadium basis, in an amount in the range of from about 0.8 to about 8.5 wt. percent, based on the total weight of said composition.

6. A composition in accordance with claim 1 wherein said calcination temperature is at or less than about 205° C.

7. A composition in accordance with claim 1 wherein said calcination temperature is at or less than about 200° C.

8. A composition consisting essentially of vanadium oxide, and an amorphous carbon selected from the group consisting of an activated carbon, an activated charcoal, and combinations thereof, which is heated to a temperature at or less than about 210° C.

9. A composition consisting of vanadium oxide, and an amorphous carbon selected from the group consisting of an activated carbon, an activated charcoal, and combinations thereof, which is heated to a temperature at or less than about 210° C.

10. A composition prepared by the method of:
   a) incorporating a vanadium compound onto, into, or onto and into an amorphous carbon selected from the group consisting of an activated carbon, an activated charcoal, and combinations thereof, in the presence of an oxidizing agent and a solvent, to thereby form a vanadium incorporated amorphous carbon; and
   b) calcining said vanadium incorporated amorphous carbon and said solvent at a calcination temperature; wherein said calcination temperature is sufficient to volatilize and remove substantially all of the solvent; and wherein said calcination temperature is at or less than about 210° C., to thereby form said composition.

11. A composition in accordance with claim 10 wherein said calcination of step b) is performed in an atmosphere such that the oxygen concentration is below that which would cause greater than about 5 wt. % of said amorphous carbon to oxidize.

12. A composition in accordance with claim 10 wherein said solvent is an aqueous solution of oxalic acid.

13. A composition in accordance with claim 10 wherein said vanadium incorporated amorphous carbon is calcined at said calcination temperature for a time period in the range of from about 0.1 to about 24 hours.

14. A composition in accordance with claim 10 wherein said vanadium is present in said composition, on elemental vanadium basis, in an amount in the range of from about 0.2 to about 28 wt. percent, based on the total weight of said composition.

15. A composition in accordance with claim 10 wherein said vanadium is present in said composition, on elemental vanadium basis, in an amount in the range of from about 0.4 to about 11 wt. percent, based on the total weight of said composition.

16. A composition in accordance with claim 10 wherein said vanadium is present in said composition, on elemental vanadium basis, in an amount in the range of from about 0.8 to about 8.5 wt. percent, based on the total weight of said composition.

17. A composition in accordance with claim 10 wherein said oxidizing agent is hydrogen peroxide.

18. A composition in accordance with claim 10 wherein said vanadium compound is selected from the group consisting of: 1) ammonium metavanadate, 2) an alkali metavanadate of the formula $MVO_3$ wherein M is an alkali metal selected from Group IA, and 3) combinations of any two or more thereof.

19. A method comprising:
   a) incorporating a vanadium compound onto, into, or onto and into an amorphous carbon selected from the group consisting of an activated carbon, an activated charcoal, and combinations thereof, in the presence of an oxidizing agent and a solvent, to thereby form a vanadium incorporated amorphous carbon; and
   b) calcining said vanadium incorporated amorphous carbon and said solvent at a calcination temperature; wherein said calcination temperature is sufficient to volatilize and remove substantially all of the solvent; and wherein said calcination temperature is at or less than about 210° C.

20. A method in accordance with claim 19 wherein said calcination of step b) is performed in an atmosphere such that the oxygen concentration is below that which would cause greater than about 5 wt. % of said amorphous carbon to oxidize.

21. A method in accordance with claim 19 wherein said solvent is an aqueous solution of oxalic acid.

22. A method in accordance with claim 19 wherein said vanadium incorporated amorphous carbon is calcined at said calcination temperature for a time period in the range of from about 0.1 to about 24 hours.

23. A method in accordance with claim 19 wherein said vanadium is present in said composition, on elemental vanadium basis, in an amount in the range of from about 0.2 to about 28 wt. percent, based on the total weight of said composition.

24. A method in accordance with claim 19 wherein said vanadium is present in said composition, on elemental vanadium basis, in an amount in the range of from about 0.4 to about 11 wt. percent, based on the total weight of said composition.

25. A method in accordance with claim 19 wherein said vanadium is present in said composition, on elemental vanadium basis, in an amount in the range of from about 0.8 to about 8.5 wt. percent, based on the total weight of said composition.

26. A method in accordance with claim 19 wherein said oxidizing agent is hydrogen peroxide.

27. A method in accordance with claim 19 wherein said vanadium compound is selected from the group consisting of: 1) ammonium metavanadate, 2) an alkali metavanadate of the formula $MVO_3$, wherein M is an alkali metal selected from Group IA; and 3) combinations of any two or more thereof.

28. A process comprising:
   a) contacting, in a contacting zone, a gaseous feed stream comprising a heavy metal and oxygen with the composition of claim 1; and
   b) withdrawing a gaseous product stream from said contacting zone.

29. A process as recited in claim 28 wherein said gaseous product stream contains less heavy metal than said gaseous feed stream.

30. A process as recited in claim 28 wherein said gaseous feed stream further comprises a contaminant selected from the group consisting of sulfur oxides, $CO_2$, water, nitrogen oxides, HCl, and combinations of any two or more thereof.

31. A process as recited in claim 28 wherein said gaseous feed stream is a combustion gas.

32. A process as recited in claim 28 wherein said gaseous feed stream is a stack gas derived from the combustion of coal.

33. A process as recited in claim 28 wherein said contacting of step a) is carried out at a temperature in the range of from about 100 to about 180° C.

34. A process as recited in claim 28 wherein said contacting of step a) is carried out at a temperature in the range of from about 125 to about 180° C.

35. A process as recited in claim 28 wherein said contacting of step a) is carried out at a temperature in the range of from about 130 to about 170° C.

36. A process as recited in claim 28 wherein said heavy metal comprises a metal selected from the group consisting of arsenic, beryllium, lead, cadmium, chromium, nickel, zinc, mercury, barium, and combinations of any two or more thereof.

37. A process as recited in claim 36 wherein said heavy metal is mercury.

38. A process as recited in claim 37 wherein said composition converts at least a portion of said mercury in said gaseous feed stream from a zero oxidation state to a +1 or a +2 oxidation state.

39. A process as recited in claim 37 wherein said mercury is present in said gaseous feed stream in an amount in the range of from about 0.1 to about 10,000 $\mu g/m^3$.

40. A process as recited in claim 37 wherein said mercury is present in said gaseous feed stream in an amount in the range of from about 1 to about 800 $\mu g/m^3$.

41. A process as recited in claim 37 wherein said mercury is present in said gaseous feed stream in an amount in the range of from about 3 to about 700 $\mu g/m^3$.

42. A process as recited in claim 37 wherein said gaseous product stream contains less than about 20 weight % of the mercury contained in said gaseous feed stream.

43. A process as recited in claim 37 wherein said gaseous product stream contains less than about 10 weight % of the mercury contained in said gaseous feed stream.

44. A process as recited in claim 37 wherein said gaseous product stream contains less than about 5 weight % of the mercury contained in said gaseous feed stream.

45. A process as recited in claim 28 wherein said gaseous product stream is contacted, in an adsorption zone, with an adsorbent.

46. A process recited in claim 45 wherein said adsorbent is selected from the group consisting of a zeolite, amorphous carbon, and combinations thereof.

47. A process as recited in claim 46 wherein said composition oxidizes at least a portion of said heavy metal in said gaseous feed stream to an elevated oxidation state.

48. A process as recited in claim 46 wherein said heavy metal is mercury and wherein said composition oxidizes at least a portion of said mercury in said gaseous feed stream from a zero oxidation state to a +1 or a +2 oxidation state.

49. A process as recited in claim 46 wherein a treated gaseous product stream is withdrawn from said adsorption zone.

50. A process as recited in claim 49 wherein said treated gaseous product stream contains less than about 20 weight % of the heavy metal contained in said gaseous feed stream.

51. A process as recited in claim 49 wherein said treated gaseous product stream contains less than about 10 weight % of the heavy metal contained in said gaseous feed stream.

52. A process as recited in claim 49 wherein said treated gaseous product stream contains less than about 5 weight % of the heavy metal contained in said gaseous feed stream.

53. A process comprising:
a) contacting, in a contacting zone, a gaseous feed stream comprising a heavy metal and oxygen with the composition of claim 10; and
b) withdrawing a gaseous product stream from said contacting zone.

54. A process as recited in claim 53 wherein said gaseous product stream contains less heavy metal than said gaseous feed stream.

55. A process as recited in claim 53 wherein said gaseous feed stream further comprises a contaminant selected from the group consisting of sulfur oxides, $CO_2$, water, nitrogen oxides, HCl, and combinations of any two or more thereof.

56. A process as recited in claim 53 wherein said gaseous feed stream is a combustion gas.

57. A process as recited in claim 53 wherein said gaseous feed stream is a stack gas derived from the combustion of coal.

58. A process as recited in claim 53 wherein said contacting of step a) is carried out at a temperature in the range of from about 100 to about 180° C.

59. A process as recited in claim 53 wherein said contacting of step a) is carried out at a temperature in the range of from about 125 to about 180° C.

60. A process as recited in claim 53 wherein said contacting of step a) is carried out at a temperature in the range of from about 130 to about 170° C.

61. A process as recited in claim 53 wherein said heavy metal comprises a metal selected from the group consisting of arsenic, beryllium, lead, cadmium, chromium, nickel, zinc, mercury, barium, and combinations of any two or more thereof.

62. A process as recited in claim 61 wherein said heavy metal is mercury.

63. A process as recited in claim 62 wherein said composition converts at least a portion of said mercury in said gaseous feed stream from a zero oxidation state to a +1 or a +2 oxidation state.

64. A process as recited in claim 62 wherein said mercury is present in said gaseous feed stream in an amount in the range of from about 0.1 to about 10,000 $\mu g/m^3$.

65. A process as recited in claim 62 wherein said mercury is present in said gaseous feed stream in an amount in the range of from about 1 to about 800 $\mu g/m^3$.

66. A process as recited in claim 62 wherein said mercury is present in said gaseous feed stream in an amount in the range of from about 3 to about 700 $\mu g/m^3$.

67. A process as recited in claim 62 wherein said gaseous product stream contains less than about 20 weight % of the mercury contained in said gaseous feed stream.

68. A process as recited in claim 62 wherein said gaseous product stream contains less than about 10 weight % of the mercury contained in said gaseous feed stream.

69. A process as recited in claim 62 wherein said gaseous product stream contains less than about 5 weight % of the heavy metal contained in said gaseous feed stream.

70. A process as recited in claim 53 wherein said gaseous product stream is contacted, in an adsorption zone, with an adsorbent.

71. A process as recited in claim 70 wherein said adsorbent is selected from the group consisting of a zeolite, amorphous carbon, and combinations thereof.

72. A process as recited in claim 71 wherein said composition oxidizes at least a portion of said heavy metal in said gaseous feed stream to an elevated oxidation state.

73. A process as recited in claim 71 wherein said heavy metal is mercury and wherein said composition oxidizes at least a portion of said mercury in said gaseous feed stream from a zero oxidation state to a +1 or a +2 oxidation state.

74. A process as recited in claim 71 wherein a treated gaseous product stream is withdrawn from said adsorption zone.

75. A process as recited in claim 74 wherein said treated gaseous product stream contains less than about 20 weight % of the heavy metal contained in said gaseous feed stream.

76. A process as recited in claim 74 wherein said treated gaseous product stream contains less than about 10 weight % of the heavy metal contained in said gaseous feed stream.

77. A process as recited in claim 74 wherein said treated gaseous product stream contains less than about 5 weight % of the heavy metal contained in said gaseous feed stream.

* * * * *